United States Patent
Sun et al.

(10) Patent No.: US 10,129,971 B2
(45) Date of Patent: Nov. 13, 2018

(54) STANDING WAVE ELECTRON LINEAR ACCELERATOR AND CONTAINER/VEHICLE INSPECTION SYSTEM

(71) Applicant: Nuctech Company Limited, Beijing (CN)

(72) Inventors: Shangmin Sun, Beijing (CN); Zhanfeng Qin, Beijing (CN); Sheng Yao, Beijing (CN); Weifeng Yu, Beijing (CN); Liwei Song, Beijing (CN); Chunguang Zong, Beijing (CN); Jinning Liang, Beijing (CN)

(73) Assignee: Nuctech Company Limited, Beijing (CN)

( * ) Notice: Subject to any disclaimer, the term of this patent is extended or adjusted under 35 U.S.C. 154(b) by 378 days.

(21) Appl. No.: 14/900,601

(22) PCT Filed: Nov. 19, 2013

(86) PCT No.: PCT/CN2013/001415
§ 371 (c)(1),
(2) Date: Dec. 21, 2015

(87) PCT Pub. No.: WO2014/201594
PCT Pub. Date: Dec. 24, 2014

(65) Prior Publication Data
US 2016/0135278 A1    May 12, 2016

(30) Foreign Application Priority Data

Jun. 21, 2013 (CN) .......................... 2013 1 0249082

(51) Int. Cl.
*G01N 23/04*    (2018.01)
*H05H 7/02*    (2006.01)
(Continued)

(52) U.S. Cl.
CPC .............. *H05H 7/02* (2013.01); *G01V 5/0016* (2013.01); *H05H 9/048* (2013.01); *H05H 2007/027* (2013.01)

(58) Field of Classification Search
CPC .. G01V 5/0016; G01V 5/0041; G01V 5/0091; G01V 5/0066; H05H 2007/027;
(Continued)

(56) References Cited

U.S. PATENT DOCUMENTS 2,931,941 A    1/1955   Dewey, II et al.
7,162,005 B2*  1/2007   Bjorkholm ........... G01V 5/0016
                                                         378/143
(Continued)

FOREIGN PATENT DOCUMENTS

CN    1304038 A    7/2001
CN    1482844 A    3/2004
(Continued)

OTHER PUBLICATIONS

Notice of Allowance dated Apr. 24, 2017, received in related Russian Application No. 2015154329; 16 pages.
(Continued)

*Primary Examiner* — Irakli Kiknadze
(74) *Attorney, Agent, or Firm* — Knobbe, Martens, Olson & Bear LLP

(57) ABSTRACT

The present invention provides a standing wave electron linear accelerator comprising a modulator and a magnetron for producing radio frequency microwaves; a plurality of accelerating tubes for accelerating electrons; a microwave transmission system for feeding the microwaves into the plurality of accelerating tubes; a plurality of electron guns for emitting electron beams into the plurality of accelerating tubes; a plurality of targets impinged by the electrons from a plurality of accelerating tubes to form continuous spec-
(Continued)

trums of X-rays; a plurality of shielding devices for shielding the continuous spectrums of X-rays generated by the targets; and a microwave distributor disposed adjacent to the end of the microwave transmission system, wherein the microwave distributor has a microwave inlet and a plurality of microwave outlets for distributing the microwaves in the microwave transmission system into the accelerating tubes.

20 Claims, 8 Drawing Sheets

(51) Int. Cl.
*H05H 9/04* (2006.01)
*G01V 5/00* (2006.01)

(58) Field of Classification Search
CPC ............ H05H 7/02; H05H 9/048; H05H 7/00; H05H 9/00; H05H 9/02; H05H 7/12; H05H 9/04; H05H 2007/022; H05H 2007/025; H01J 35/14; H01J 2235/08; H01J 29/48; H01J 35/00; H01J 35/02; H01J 35/16; H01J 2235/087; H01J 35/24; G21K 1/093; G01N 2223/639; H05G 1/02
USPC ........................................... 378/4, 37, 57, 62
See application file for complete search history.

(56) References Cited

U.S. PATENT DOCUMENTS

| 8,284,898 | B2 | 10/2012 | Ho et al. |
| 2008/0043910 | A1* | 2/2008 | Thomas ................... H05H 7/02 378/65 |
| 2008/0089469 | A1 | 4/2008 | Chen et al. |
| 2008/0211431 | A1 | 9/2008 | Mishin et al. |
| 2010/0098214 | A1* | 4/2010 | Star-Lack ................ A61B 6/04 378/65 |
| 2010/0231144 | A1 | 9/2010 | Leek |
| 2011/0274242 | A1 | 11/2011 | Linev |
| 2012/0257719 | A1 | 10/2012 | Jangaard et al. |

FOREIGN PATENT DOCUMENTS

| CN | 1490616 A | 4/2004 |
| CN | 101162206 A | 4/2008 |
| CN | 201063958 Y | 5/2008 |
| CN | 202077262 U | 12/2011 |
| CN | 102340922 A | 2/2012 |
| CN | 102834738 A | 12/2012 |
| CN | 202837565 U | 3/2013 |
| CN | 203416494 U | 1/2014 |
| JP | H013-13899 A | 12/1989 |
| JP | 2011128007 A | 6/2011 |
| PL | 219823 | 7/2015 |
| RU | 2314942 | 1/2008 |
| RU | 2378641 | 1/2010 |

OTHER PUBLICATIONS

Search Report dated Jun. 6, 2017, received in related Polish patent application No. P.415877; 3 pages.
International Search Report dated Mar. 27, 2014 in Application No. PCT/CN2013/001415.
Chinese Search Report/Office Action dated Feb. 16, 2016 in Application No. 201310249082.9 (15 pgs.), and English language summary/statement of relevance regarding same (2 pgs.); 17 pages total.

* cited by examiner

STANDING WAVE ELECTRON LINEAR ACCELERATOR AND CONTAINER/VEHICLE INSPECTION SYSTEM

CROSS-REFERENCE TO RELATED APPLICATIONS

This application claims priority to PCT Application No. PCT/CN2013/001415, filed Nov. 19, 2013, published as WO2014/201594A1, entitled "Standing Wave Electron Linear Accelerator and Container/Vehicle Inspection System" and Chinese Patent Application No. 201310249082.9, filed on Jun. 21, 2013, published as CN104244561A, and entitled "Standing Wave Electron Linear Accelerator and Container/Vehicle Inspection System", which are hereby incorporated by reference in their entirety.

FIELD OF THE INVENTION

The present invention relates to a standing wave electron linear accelerator, and a container/vehicle inspection system using the standing wave electron linear accelerator, and more particularly to a dual-channel fast-scan container/vehicle inspection system, a mobile container/vehicle inspection system and a relocatable container/vehicle inspection system.

BACKGROUND

Traditionally, radiation imaging technique has been widely used in container/vehicle inspection systems.

A low-energy standing wave electron linear accelerator (sometimes hereinafter referred to as accelerator) is often used as a radiation source in the radiation imaging technique. The low-energy standing wave electron linear accelerator mainly comprises a control mechanism, a modulator, a magnetron, a microwave transmission system and a ray handpiece assembly, etc.

Its working principle is that the control mechanism controls in a manner that the modulator generates high-voltage pulses, which are provided to the magnetron through a pulse transformer to thereby generate radio frequency microwaves in the magnetron. The radio frequency microwaves are fed into an accelerating tube of the ray handpiece assembly by means of the microwave transmission system to form forward waves and backward waves in the accelerating tube, which are superposed to form standing waves.

Furthermore, an electron gun power source in the modulator generates high-voltage pulses and provides the high-voltage pulses to an electron gun of the accelerating tube. By means of the high-voltage pulses, electrons are drawn out from a filament-heated cathode of the electron gun and are accelerated and transmitted to an accelerating cavity of the accelerating tube. The electrons interact with an axial standing wave electric field in the accelerating cavity and absorb energy therefrom to keep being accelerated. When the acceleration of the electrons comes to an end, the electrons are shot at a target to produce a continuous spectrum of X-rays. A shielding device and an outer collimator are used to appropriately shield X-rays oriented at other angles so as to remain an X-ray beam of a desired shape in a forward direction.

FIG. 1 is a schematic view of a microwave transmission system of a standing wave electron linear accelerator of the prior art. As shown, the microwave transmission system is connected between a magnetron and an accelerating tube to transmit microwaves generated by the magnetron to the accelerating tube, and mainly comprises a curved waveguide tube, a four-port circulator, a straight waveguide tube, a soft waveguide tube and a waveguide window.

With reference to FIG. 1, in the prior art, the microwaves from the magnetron are supplied to an accelerating tube through the microwave transmission system to accelerate electrons in the accelerating tube. Then, the accelerated electrons are shot at a target to form a continuous spectrum of X-rays. Namely, the prior art is directed to a single target standing wave electron linear accelerator.

According to the prior art described above, the standing wave electron linear accelerator can, however, only shoot a single target to produce one X-ray beam.

In regard to the container/vehicle inspection system, according to the prior art, the inspection system is a single-channel inspection system and the radiation source is a single target standing wave electron linear accelerator, so the inspection system can only transmit a continuous spectrum of X-rays to one scanning channel and is unable to conduct radiation imaging inspection for two containers/vehicles at the same time, thereby resulting in low inspection efficiency.

In regard to the mobile container/vehicle inspection system, patent document 1 (CN1490616A) discloses a mobile container inspection system. A rotatable platform is arranged on a scanning vehicle and is movable with respect to the scanning vehicle. On the rotatable platform there are a parallelogram bracket formed by four linkage bars hinged one to another and a transverse detector arm and a vertical detector arm comprising detectors and connected with the bracket. Further, a box-shaped cabin installed with a radiation source is mounted at the rear end of the rotatable platform. Upon inspection, the rotatable platform on the scanning vehicle is rotated 90 degrees, and a scanning channel is constructed from a portal-shaped frame formed of the parallelogram bracket, the transverse detector arm and the vertical detector arm. The control mechanism controls the radiation source to emit X-rays. The X-rays forming a sector pass through the container to be inspected and are received by the detectors in the transverse detector arm and the vertical detector arm so as to be converted into electrical signals and then input into an image obtaining module. The image obtaining module transmits the image signals to an image analyzing software for processing and the computer will show the detected result.

The mobile container inspection system of patent document 1 is also a one-channel inspection system and cannot conduct radiation imaging inspection for two containers at the same time, thereby resulting in low inspection efficiency.

In regard to the relocatable container inspection system, FIG. 16 shows a relocatable container inspection system disclosed in patent document 2 (CN1304038A), which comprises a mobile shielding chamber, an automatic scanning vehicle and a remote control mechanism, wherein the mobile shielding chamber is detachably assembled, and on the automatic scanning vehicle there are a portal frame consisting of a horizontal arm and a vertical arm with detectors, a radiation source and a bi-directional mobile trailer frame. According to the invention of patent document 2, since the shielding chamber can be detachably assembled and the automatic scanning vehicle can run, it is possible that the inspection system can detect at random at different places without occupying fixed inspection space and saving investment on fixed inspection location.

According to the prior art described above, the inspection system is, however, also a single-channel inspection system and is unable to conduct radiation imaging inspection for two containers at the same time, thereby resulting in low inspection efficiency.

SUMMARY OF THE INVENTION

The present invention is aimed for solving the above problems in the prior art. The object thereof is to provide a standing wave electron linear accelerator, which is of a multi-target type and is able to shoot multiple targets simultaneously so as to form multiple X-ray beams simultaneously. The present invention further provides a container/vehicle inspection system capable of conducting inspection on the basis of dual-channel scanning, so as to conduct radiation imaging inspection for containers/vehicles by means of dual scanning channels, which improves inspection efficiency.

As a technical solution of the present invention, a standing wave electron linear accelerator is provided, characterized in that, comprising:

a magnetron for producing radio frequency microwaves;

a plurality of accelerating tubes for forming standing waves therein to accelerate electrons therein;

a microwave transmission system connected between the magnetron and the plurality of accelerating tubes to feed the microwaves from the magnetron into the plurality of accelerating tubes to form standing waves in the plurality of accelerating tubes;

a plurality of electron guns for emitting electron beams into the plurality of accelerating tubes;

a plurality of targets corresponding to and located in the plurality of accelerating tubes respectively, which are adapted to be impinged by the accelerated electron beams in the accelerating tubes to form a continuous spectrum of X-rays;

a plurality of shielding devices disposed corresponding to the plurality of targets, which are adapted to, among the plurality of continuous spectrums of X-rays, remain an X-ray beam of a desired shape in a forward direction and shield X-rays oriented at other angles; and a microwave distributor disposed in the microwave transmission system for distributing the microwaves in the microwave transmission system into the accelerating tubes.

According to the present invention, a multi-target standing wave electron linear accelerator can be formed. Microwaves generated by one magnetron can be transmitted to the plurality of accelerating tubes by means of one microwave transmission system. The plurality of targets can be shot simultaneously to form the plurality of X-ray beams simultaneously.

Preferably, the standing wave electron linear accelerator comprises a modulator for generating high-voltage pulses. The magnetron is adapted to receive the high-voltage pulses from the modulator to form radio frequency microwaves. The plurality of electron guns is adapted to receive the high-voltage pulses from the modulator to emit electron beams.

Preferably, the standing wave electron linear accelerator is of a dual-target type. There are two accelerating tubes, two targets and two shielding devices. The microwave distributor is adapted to distribute the microwaves in the microwave transmission system into the two accelerating tubes to emit X-ray beams towards both sides respectively.

Preferably, the microwave distributor is a branching tube having a microwave inlet port and two microwave outlet ports.

The two accelerating tubes can be inclined upwardly with respect to a horizontal direction. Further, the two accelerating tubes can be staggered with one another in the front-rear direction of the standing wave electron linear accelerator.

Preferably, each of the plurality of accelerating tubes can produce single energy or dual-energy X-rays.

Preferably, doses of the generated X-rays may be identical or different.

Furthermore, as another technical solution of the present invention, a container/vehicle inspection system is provided, characterized in that, comprising:

a first portal assembly for forming a first scanning channel and provided with a plurality of first detector modules;

a second portal assembly for forming a second scanning channel and provided with a plurality of second detector modules; and a radiation source, which is the above mentioned dual-target standing wave electron linear accelerator, disposed between the first portal assembly and the second portal assembly to emit X-ray beams to the first scanning channel and the second scanning channel respectively.

According to the present invention, a dual-channel container/vehicle inspection system can be formed. One radiation source can be used to emit X-ray beams to two scanning channels simultaneously so as to conduct radiation imaging inspection of two channels at the same time, thereby greatly improving the inspection efficiency.

Preferably, the container/vehicle inspection system comprises a control mechanism comprising a radiation source controlling module and an image acquiring module.

Preferably, the container/vehicle inspection system comprises a device cabin disposed between the first portal assembly and the second portal assembly, and the radiation source and the control mechanism are disposed in the device cabin.

Preferably, the container/vehicle inspection system comprises a first speed sensor and a second speed sensor for detecting traveling speeds of the inspected containers/vehicles in the first and second scanning channels respectively. The radiation source control module respectively controls the emitting frequencies of the X-ray beams emitted from the radiation source to the first and second scanning channels on the basis of the detection results of the first and second speed sensors.

According to the present invention, the moving speeds of the containers/vehicles in the respective first and second scanning channels can be used to control the emitting frequencies of two X-ray beams emitted by the radiation source, and therefore the inspection can be conducted more precisely according to different moving speeds of the containers/vehicles. Since the radiation source control module can respectively control the emitting frequencies X-ray beams emitted from the radiation source to the first and second scanning channels according to the detection results of the first and second speed sensors, the emitting frequencies of the X-ray beams in the first and second scanning channels can be respectively adjusted even if the moving speeds of the containers/vehicles in the first and second scanning channels are different, which guarantees precise inspection of the containers/vehicles in the two scanning channels.

Preferably, the radiation source control module can control the emission/stop of the two X-ray beams emitted by the radiation source.

Preferably, the container/vehicle inspection system comprises a first position sensor and a second position sensor for detecting the travelling positions of the inspected containers/ vehicles in the first and second scanning channels respectively. When it is determined that the container/vehicle reaches a predetermined position in the first scanning channel according to the detection result of the first position sensor, the radiation source emits X-ray beams to the first scanning channel. When it is determined that the container/vehicle reaches a predetermined position in the second scanning channel according to the detection result of the second position sensor, the radiation source emits X-ray beams to the second scanning channel.

According to the present invention, the emission of the X-rays can be stopped when there is no container/vehicle in the scanning channels, thereby avoiding unnecessary energy waste and ensuring radiation safety. A single channel scanning inspection or a dual-channel scanning inspection can be selected on actual demands by emission or stoppage of X-rays in two respective scanning channels. Further, since the X-ray beams are emitted only when it is determined that the container/vehicle reaches the predetermined position in the first or second scanning channel, drivers or other devices can be protected from X-ray injury by properly setting the position of the container/vehicle where the X-ray beams are emitted.

Preferably, the first and second portal assemblies are staggered from one another in the travelling direction of the container/vehicle. The incident positions of the X-ray beams emitted from the radiation source to the first and second scanning channels are staggered from one another in the travelling direction of the container/vehicle.

According to the present invention, radiation protection effect can be better optimized.

Preferably, the first portal assembly comprises a first transverse detector arm support and a first vertical detector arm support. The plurality of the first detector modules is respectively disposed on the first transverse detector arm support and the first vertical detector arm support. The second portal assembly comprises a second transverse detector arm support and a second vertical detector arm support. The plurality of the second detector modules is respectively disposed on the second transverse detector arm support and the second vertical detector arm support.

The first transverse detector arm support and the second transverse detector arm support can extend perpendicular to the traveling direction of the container/vehicle respectively. The incident directions of the X-ray beams emitted from the radiation source into the first and second scanning channels respectively are perpendicular to the traveling direction of the container/vehicle.

The first transverse detector arm support and the second transverse detector arm support may also extend at a predetermined angle with respect to the direction perpendicular to the traveling direction of the container/vehicle respectively. The incident direction of the X-ray beams emitted from the radiation source into the first and second scanning channels respectively is at the predetermined angle with respect to the direction perpendicular to the traveling direction of the container/vehicle.

According to the present invention, the angle between the first and second scanning channels and the traveling direction of the container/vehicle can be properly adjusted according to the actual position of the inspection system.

Preferably, the control mechanism is adapted to conduct control operation based on an automatic control program.

According to the present invention, control based on the automatic control program can reduce the workload of manual operation.

Additionally, as a further technical solution of the present invention, a mobile container/vehicle inspection system is provided, characterized in that, comprising:

a chassis vehicle which is a traveling mechanism;

a pair of left and right portal assemblies which are switchable between an open state in which scanning channels are formed at left and right sides of the chassis vehicle and a retracted state in which the portal assemblies are retracted towards the chassis vehicle;

a radiation source, which is the above mentioned dual-target standing wave electron linear accelerator, capable of emitting X-ray beams towards left and right sides simultaneously;

a plurality of detector modules respectively mounted on the pair of portal assemblies to detect the X-ray beams emitted from the radiation source; and a control mechanism including an action control module for controlling actions of the rotary platform and the portal assemblies, a radiation source control module for controlling action of the radiation source and an image acquisition module for forming inspection images.

According to the present invention, a dual-channel mobile container/vehicle inspection system can be provided. The chassis vehicle can be used to form two radiation image scanning channels simultaneously, and the radiation source composed of the dual-target standing wave electron linear accelerator emits X-ray beams towards two scanning channels simultaneously so as to conduct radiation imaging inspection for two channels simultaneously, thereby greatly improving the inspection efficiency.

Preferably, the mobile container/vehicle inspection system comprises a pair of left and right rotary platforms mounted on the chassis vehicle, and the left and right rotary platforms can be rotated towards left and right sides of the chassis vehicle respectively. The left and right portal assemblies are mounted on the chassis via the left and right rotary platforms respectively and can be rotated along with the left and right rotary platforms.

Preferably, each of the left and right portal assemblies includes a transverse detector arm support and a vertical detector arm support. The transverse detector arm supports are respectively mounted on the pair of rotary platforms via elevating actuators. The transverse detector arm supports and the vertical detector arm supports can be elevated together when driven by the elevating actuators. The vertical detector arm supports are respectively mounted on the transverse detector arm supports via expanding actuators. The vertical detector arm supports can be rotated to be expanded with respect to the transverse detector arm supports under the actuation of the expanding actuators.

According to the present invention, the pair of portal assemblies can be linked to be appropriately actuated with respect to the pair of left and right rotary platforms, such that the pair of portal assemblies can be used to form a scanning channel at each of the left and right sides of the chassis vehicle.

Preferably, the plurality of detector modules are respectively mounted on the transverse detector arm supports and the vertical detector arm supports of the pair of portal assemblies.

Preferably, the pair of rotary platforms are located on the rear end of the chassis vehicle.

Preferably, the radiation source is disposed in the lower rear part of the rotary platform so that the X-ray source point of the radiation source is lower than the chassis of the chassis vehicle.

Thus, the X-rays form a sector emitted from the radiation source pass through the inspected containers/vehicles at a lower position and can be appropriately received by the plurality of detectors mounted on the transverse detector arm support and the vertical detector arm support of the portal assemblies.

Preferably, the pair of left and right portal assemblies in the retracted state are kept above a control cabin and are received inside the chassis vehicle when viewed in a left-right direction of the chassis vehicle.

Furthermore, as a technical solution of the present invention, a relocatable container/vehicle inspection system is provided. The relocatable container/vehicle inspection system has an automatic scanning vehicle and an action control mechanism for the automatic scanning vehicle, and is characterized in that the automatic scanning vehicle includes a vehicle frame capable of moving with respect to the ground by means of drive wheels;

a pair of left and right portal assemblies arranged on the vehicle frame, wherein the left and right portal assemblies can extend from the vehicle frame towards the left and right sides of the automatic scanning vehicle respectively so as to form scanning channels at left and right sides of the automatic scanning vehicle;

a radiation source, which is the above mentioned dual-target standing wave electron linear accelerator, capable of emitting X-ray beams simultaneously towards the scanning channels at the left and right sides of the automatic scanning vehicle; and a plurality of detector modules mounted on the pair of portal assemblies respectively, which can detect the X-ray beams emitted from the radiation source and convert the detected result into electric signals.

According to the present invention, a relocatable container/vehicle inspection system is provided. Radiation image scanning channels can be formed at both sides of the automatic scanning vehicle simultaneously, and the radiation source composed of the dual-target standing wave electron linear accelerator emits X-ray beams towards two scanning channels simultaneously and conducts radiation imaging inspection for two channels simultaneously, thereby greatly improving the inspection efficiency.

Preferably, the relocatable container/vehicle inspection system has a mobile shielding room, and the mobile shielding room is used for blocking X-rays and is detachable.

Preferably, the action control mechanism of the automatic scanning vehicle is a remote control mechanism disposed outside of the mobile shielding room and including an actuation control module, an operation detection module, a display module and a control mechanism-side communication device.

Preferably, the vehicle frame is provided thereon with a device cabin, in which there are a radiation source control module for controlling actions of the radiation source on the basis of the signal from the control device;

an image acquisition module for forming inspection images on the basis of the electric signals from the detector module; and a device cabin-side communication device communicating with the control mechanism-side communication device.

Preferably, the pair of left and right portal assemblies have transverse detector arm supports and vertical detector arm supports respectively, by means of which scanning channels can be formed at the left and right sides of the automatic scanning vehicle respectively.

Preferably, the plurality of detector modules is respectively arranged on the transverse detector arm supports and the vertical detector arm supports.

Preferably, the automatic scanning vehicle is movable along a guide rail disposed on the ground by means of drive wheels mounted on the lower surface of the vehicle frame.

Preferably, the lower ends of the vertical detector arm supports in the pair of left and right portal assemblies are movable by driven wheels respectively along the guide rail disposed on the ground.

Figure 1:
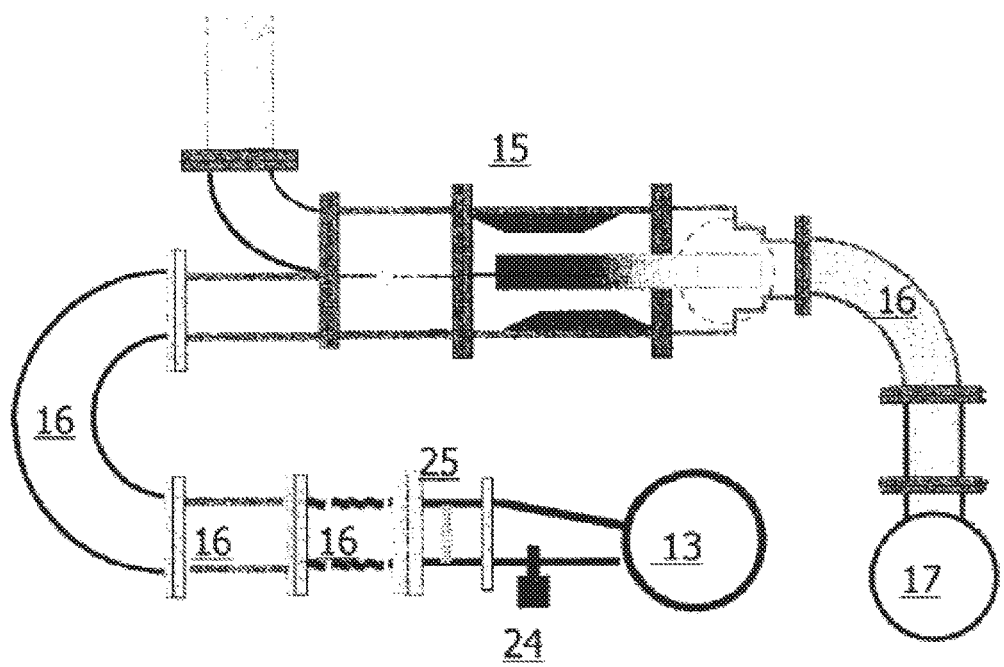
FIG. 1 is a schematic view of a microwave transmission system of a prior art standing wave electron linear accelerator.

REFERENCE SIGN LIST 11 shielding device
12 titanium pump power source
13 first accelerating tube
14 pulse transformer
15 circulator
16 wave guide tube
17 magnetron
18 second accelerating tube
19 first accelerating tube target
20 second accelerating tube target
21 microwave distributor
22 second accelerating tube electron gun
23 first accelerating tube electron gun
24 titanium pump
25 waveguide window
101 first detector module
102 first transverse detector arm support
103 first vertical detector arm support
104 container truck
105 first scanning channel
106 device cabin
107 radiation source (dual-target standing wave electron linear accelerator)
108 control mechanism
116 first support arm
117 first speed sensor
118 first position sensor
121 second detector module
122 second transverse detector arm support
123 second vertical detector arm support
125 second scanning channel
126 second support arm
127 second speed sensor
128 second position sensor
201 detector module
202 first vertical detector arm support
203 first transverse detector arm support
204 first container truck
205 first scanning channel
206 device cabin
207 radiation source (dual-target standing wave electron linear accelerator)
208 chassis vehicle
209 control cabin
210 rotary platform
211 elevating hydraulic cylinder
212 rotary platform hydraulic motor
222 second vertical detector arm support
223 second transverse detector arm support
224 second container truck
225 second scanning channel
301 detector module
302 first vertical detector arm support
303 first transverse detector arm support
304 container/vehicle
305 first scanning channel
306 device cabin
307 radiation source (dual-target low-energy standing wave electron linear accelerator)
308 vehicle frame
309 drive wheel
310 guide rail
311 driven wheel
322 second vertical detector arm support
323 second transverse detector arm support
325 second scanning channel.

DETAILED DESCRIPTION

Firstly, it should be noted that the section only describes the preferred embodiments of the present invention. Without changing the principle of the present invention, those skilled in the art can vary and/or modify the technical solution described herein. These variations and/or modifications will fall within the scope of the present invention.

The preferred embodiments of the present invention will be described in detail with reference to the drawings.

(I) Low-Energy Standing Wave Electron Linear Accelerator

Example 1

Figure 2:
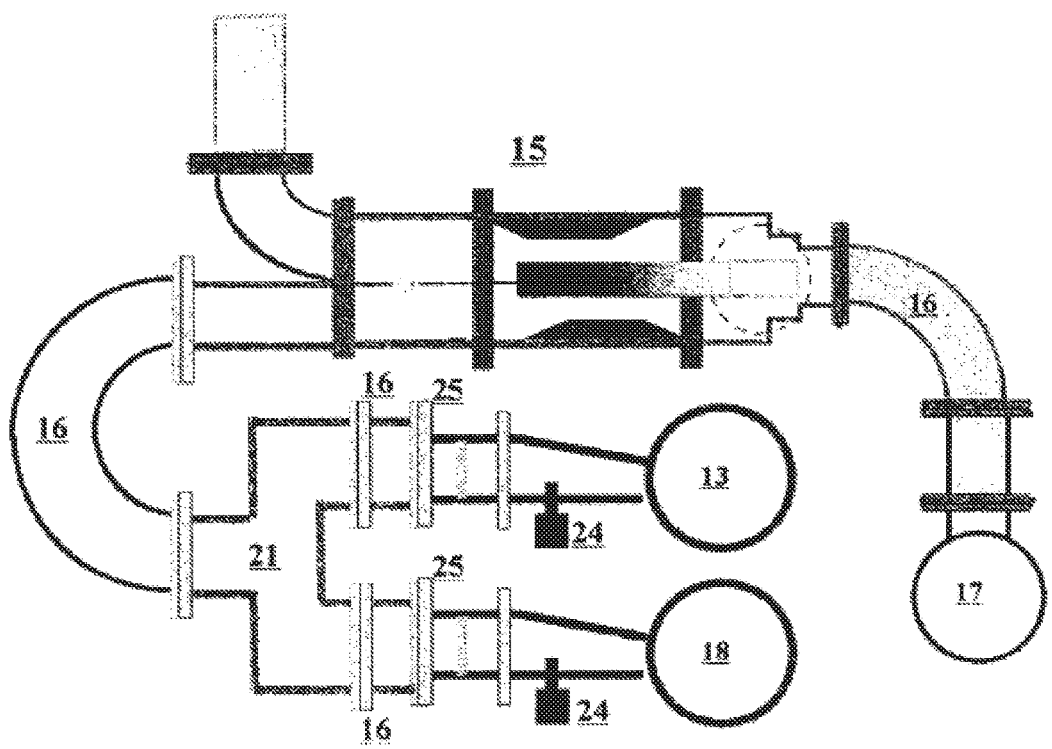
FIG. 2 is a schematic view of an example of the standing wave electron linear accelerator according to the present invention.
Figure 3:
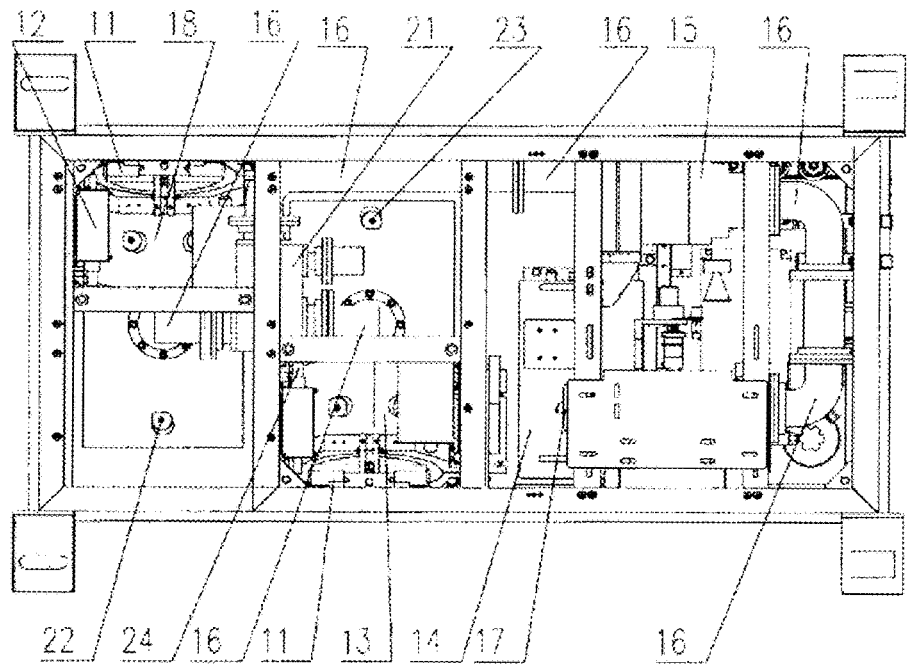
FIG. 3 is a top view of an example of the standing wave electron linear accelerator according to the present invention, wherein the up-down direction of FIG. 3 is the left-right direction of the standing wave electron linear accelerator, and the left-right direction of FIG. 3 is the front-back direction of the standing wave electron linear accelerator.
Figure 4:
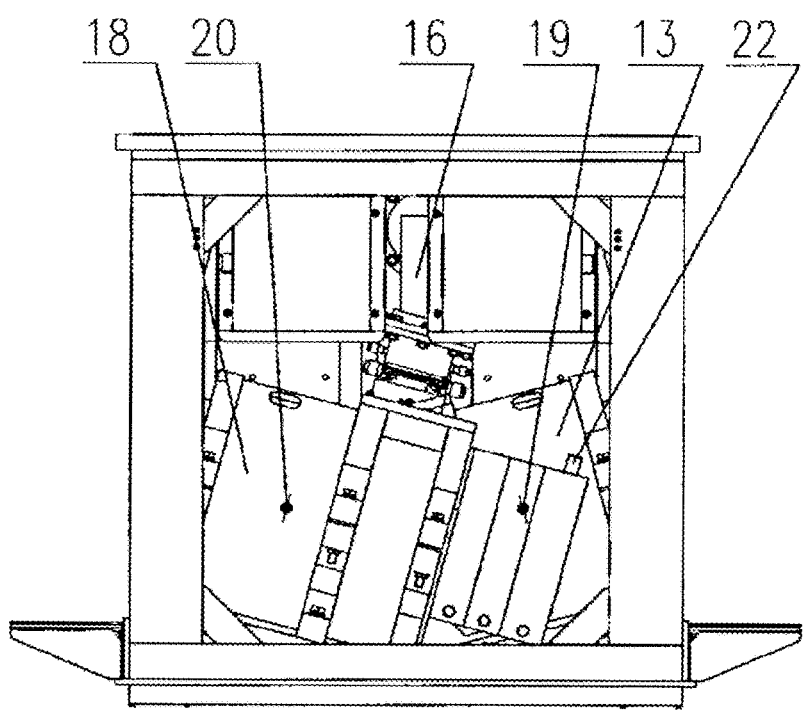
FIG. 4 is a front view of an example of the standing wave electron linear accelerator according to the present invention, wherein the left-right direction of FIG. 4 is the left-right direction of the standing wave electron linear accelerator, and the direction perpendicular to the paper of FIG. 4 is the front-back direction of the standing wave electron linear accelerator.

FIG. 2 is a schematic view of a standing wave electron linear accelerator (107, 207, 307) according to the present invention, FIG. 3 is a top view of an example of the standing wave electron linear accelerator according to the present invention, and FIG. 4 is a front view of an example of the standing wave electron linear accelerator according to the present invention. The left-right direction of FIG. 4 and the up-down direction of FIG. 3 are the left-right direction of the standing wave electron linear accelerator. When the standing wave electron linear accelerator is mounted onto a container/vehicle inspection system, the left-right direction of the container/vehicle inspection system shall be consistent with the left-right direction of the standing wave electron linear accelerator. The left-right direction of FIG. 3 and the direction perpendicular to the paper of FIG. 4 are the front-back direction of the standing wave electron linear accelerator. When the standing wave electron linear accelerator is mounted onto the container/vehicle inspection system, the front-back direction of the standing wave electron linear accelerator shall be consistent with the travelling direction of the container/vehicle.

As known from FIG. 2 to FIG. 4, a dual-target standing wave electron linear accelerator 107 of the present invention can feed radio frequency microwaves generated by a magnetron 17 into a pair of accelerating tubes (a first accelerating tube 13 and a second accelerating tube 18) simultaneously by means of a microwave transmission system. An accelerating microwave field is formed in each of the pair of accelerating tubes 13, 18 to provide energy required by the accelerating tubes 13, 18 for acceleration.

In the example shown in FIGS. 3 and 4, two accelerating tubes 13, 18 are staggered when viewed from front (the left-right direction of FIG. 3 and the direction perpendicular to the paper of FIG. 4) and inclined with respect to the horizontal direction. The sectors formed of the X-ray beams emitted from the two accelerating tubes 13, 18 are along the left-right direction of the standing wave electron linear accelerator 107.

In particular, the standing wave electron linear accelerator 107 has a modulator (not shown) for generating high-voltage pulses. The high-voltage pulses generated by the modulator are transformed into suitable pulses by a pulse transformer 14 and then supplied to the magnetron 17 acting as a microwave source. The magnetron 17 receives the high-voltage pulses and then outputs radio frequency microwaves in the form of pulses. The radio frequency microwaves are transmitted to the pair of accelerating tubes 13, 18 respectively by the microwave transmission system, in such a manner that standing waves can be formed inside the accelerating tubes 13, 18 to accelerate electrons in the accelerating tubes 13, 18.

The microwave transmission system can mainly include a waveguide tube 16 for transmitting microwave power, a circulator 15 acting as an isolator, and a waveguide window 25 for isolating the accelerating tubes and the microwave transmission system, etc.

A straight waveguide tube, a bended waveguide tube, a soft waveguide tube and the like or the combination thereof can be used as the waveguide tube 16 depending on actual requirements on structure and arrangement. In the example shown in FIG. 2, a bended waveguide tube, a straight waveguide tube and a soft waveguide tube are combined for use as the waveguide tube 16.

Figure 7:
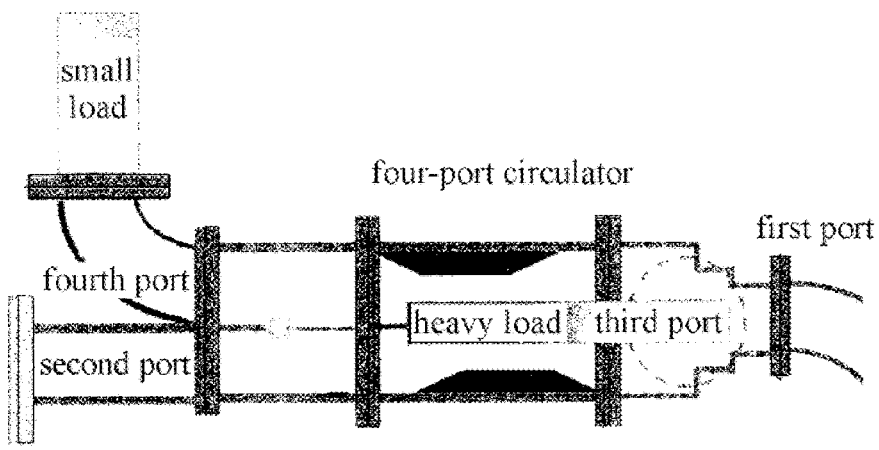
FIG. 7 is a schematic view of the working principle of a four-port circulator acting as an example of a circulator.

In the present invention, a four-port circulator is used as the circulator 15. FIG. 7 schematically shows the structural view of the four-port circulator. With reference to FIGS. 2 and 7, the four-port circulator 15 is used as an isolator. Microwave power from the upstream waveguide tube 16 is input through a first port of the four-port circulator 15 and then output through a second port thereof, and into the pair of accelerating tubes 13, 18 via the waveguide tube 16 at the downstream side. The microwave power reflected from the pair of accelerating tubes 13, 18 is input through a second port and then output through a third port, and is absorbed by a heavy load connected at the third port. A small amount of microwave power reflected by the heavy load is further sent to a fourth port and absorbed by a small load connected at the fourth port. An isolating degree from the second port to the first port is high, generally greater than 25 dB. There is only a very small portion of the power reflected by the accelerating tubes 13, 18 that return to the magnetron 17 after passing through the four-port circulator 15, so the accelerating tubes 13, 18 acting as the load of the magnetron 17 will have little influence on the working state of the magnetron 17. The four-port circulator 15 needs constant-temperature cooling water to keep the temperature thereof in operation substantially constant. Over-large temperature variation will influence the parameters thereof, such as insertion loss and isolating degree, and further influence the normal operation of the magnetron 17 and the microwave power into the accelerating tubes 13, 18. It should be explained that the four-port circulator is given as an example of the circulator 15. However, the circulator 15 is not limited to a four-port circulator, and a three-port circulator, for example, can also be used.

In particular, the microwave transmission system of the present invention further has a microwave distributor 21 for branching the microwaves into the accelerating tubes 13, 18. The microwave distributor is located adjacent to the end of the microwave transmission system. In an example shown in FIG. 2, two outlet ports of the microwave distributor 21 are respectively connected with the first accelerating tube 13 and the second accelerating tube 18 via the waveguide tube 16 and the waveguide window 25 so as to branch the microwaves from the upstream side into the downstream accelerating tubes 13, 18.

Figure 8:
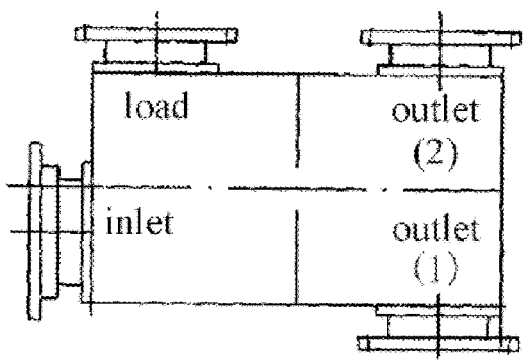
FIG. 8 is a schematic view of an example of a microwave distributor according to the present invention.

FIG. 8 is a schematic view of an example of the microwave distributor of the present invention. As shown, the microwave distributor 21 is a branching tube having one inlet port and two outlet ports. However, the microwave distributor 21 of the present invention is not limited to the above structure. It can be of any structure as long as it can make the microwave transmission system to branch towards the two accelerating tubes 13, 18. For example, the microwave distributor can be made of any known material and in any known form as required.

Then, the microwaves of the microwave transmission system branch from the microwave distributor 21 and are transmitted to the accelerating tubes 13, 18 via the downstream waveguide tube 16 and the waveguide window 25. In this case, the phases of the microwaves fed into the accelerating tubes can be adjusted so as to form forward waves and backward waves which are superposed to form stable standing wave accelerating electric fields in the accelerating tubes 13, 18 respectively.

Adjacent to the inlet of the first accelerating tube 13 there are a titanium pump 24 for vacuumizing the first accelerating tube 13 and a first accelerating tube electron gun 23 for emitting electron beams into the first accelerating tube 13. Adjacent to the inlet of the second accelerating tube 18 there are a titanium pump 24 for vacuumizing the second accelerating tube 18 and a second accelerating tube electron gun 22 for emitting electron beams into the second accelerating tube 18. The modulator supplies high-voltage pulses to the two electron guns 22, 23 via preposed transformers (not shown) of electron guns.

In each of the electron guns 22, 23, the high-voltage pulses draw the electrons from a cathode heated by a light filament to form electron beams and then accelerate and transmit them into the accelerating tubes 13, 18.

The electron beams transmitted into the accelerating tubes 13, 18 absorb energy in the stable standing wave accelerating electric fields and are then accelerated.

As shown in FIG. 4, a first accelerating tube target 19 is disposed inside the end of the first accelerating tube 13, and a second accelerating tube target 20 is disposed inside the end of the second accelerating tube 18. The electron beams accelerated in the accelerating tubes 13, 18 respectively impinge the targets 19, 20 to generate a continuous spectrum of X-rays respectively. The dose of the X-ray beams generated by two targets can be identical or different. Shielding devices 11 are each disposed in place corresponding to the X-rays at the outlets of the accelerating tubes 13, 18. The shielding devices 11 only remain the X-ray beams of desired shape in a required direction and shield X-rays at other angles. Then, both of the two accelerating tubes 13, 18 can generate single energy or dual energy X-rays.

Therefore, according to the present invention, one standing wave electron linear accelerator 107 can be used to emit X-ray beams towards left and right directions simultaneously.

Furthermore, in the present example, a radiation source control module of the container/vehicle inspection system as described below can control the emission and stoppage of the X-ray beams towards both sides by the radiation source 107 by controlling emission of electron beams by the first accelerating tube electron gun 23 and the second accelerating gun electron tube 22.

Example 2

Figure 5:
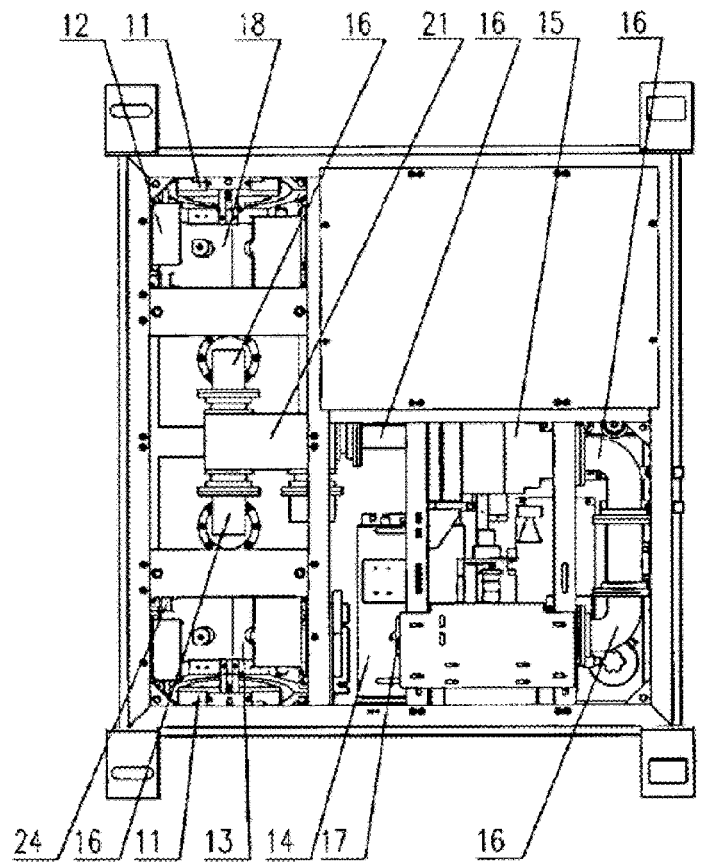
FIG. 5 is a top view of a further example of the standing wave electron linear accelerator according to the present invention, wherein the up-down direction of FIG. 5 is the left-right direction of the standing wave electron linear accelerator, and the left-right direction of FIG. 5 is the front-back direction of the standing wave electron linear accelerator.
Figure 6:
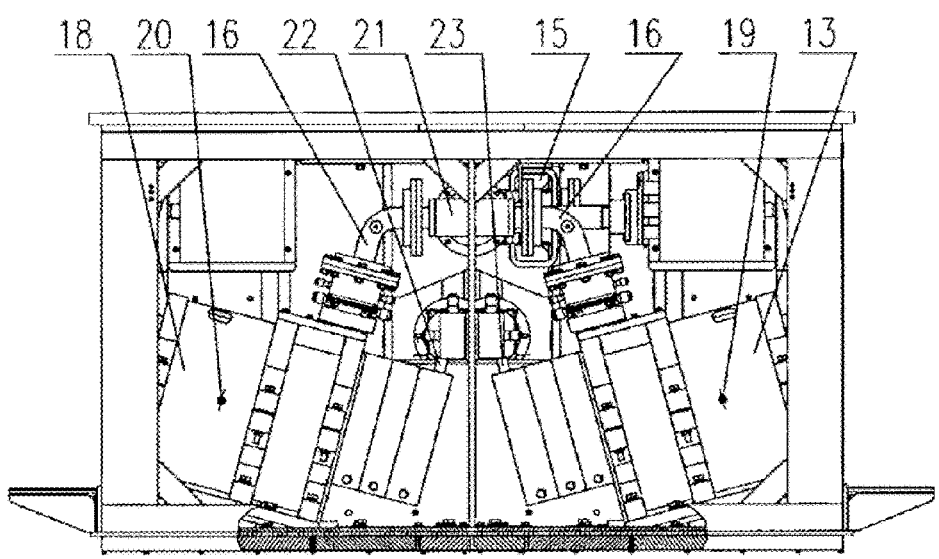
FIG. 6 is a front view of a further example of the standing wave electron linear accelerator according to the present invention, wherein the left-right direction of FIG. 6 is the left-right direction of the standing wave electron linear accelerator, and the direction perpendicular to the paper of FIG. 6 is the front-back direction of the standing wave electron linear accelerator.

FIG. 5 is a top view of a further example of the standing wave electron linear accelerator according to the present invention, and FIG. 6 is a front view of the a further example of the standing wave electron linear accelerator according to the present invention, wherein the up-down direction of FIG. 5 and the left-right direction of FIG. 6 are the left-right direction of the standing wave electron linear accelerator. The content identical with or similar to the Example 1 is omitted and only differences will be explained.

In the present example, two accelerating tubes 13 and 18 are bilaterally symmetric. That is to say, two accelerating tubes 13 and 18 are symmetrically arranged in the up-down direction of FIG. 5 and the left-right direction of FIG. 6.

In addition, in the examples shown in FIGS. 3 to 6, the sectors formed of the X-ray beams emitted from two accelerating tubes 13, 18 respectively are along the left-right direction of the standing wave electron linear accelerator 107. However, it is not limited thereto. It is also possible that the sectors formed of the X-ray beams emitted from two accelerating tubes 13, 18 are inclined at a predetermined angle with respect to the left-right direction of the standing wave electron linear accelerator 107. In the examples shown in FIGS. 3 to 6, the two accelerating tubes 13, 18 are respectively inclined with respect the horizontal direction. However, the two accelerating tubes 13, 18 can also be horizontally arranged or vertically arranged as required.

The above embodiment discloses that the microwave transmission system has a straight waveguide tube, a curved waveguide tube, a four-port circulator, a soft waveguide tube and a waveguide window. Of course, the configuration and arrangement of the waveguide tube, the circulator and the waveguide window can be suitably selected depending on the particular specification of the accelerator.

The above embodiments disclose examples that the standing wave electron linear accelerator has two accelerating tubes. However, it is not limited thereto. The standing wave electron linear accelerator can have a plurality of accelerating tubes as required, and the microwave distributor can have a corresponding number of branching outlet ports to branch the upstream microwaves into the respective accelerating tubes, such that a plurality of X-ray beams can be formed simultaneously towards a plurality of directions.

(II) Dual-Channel Fast-Scan Container/Vehicle Inspection System

1. Structure of the Dual-Channel Fast-Scan Container/Vehicle Inspection System

Figure 9:
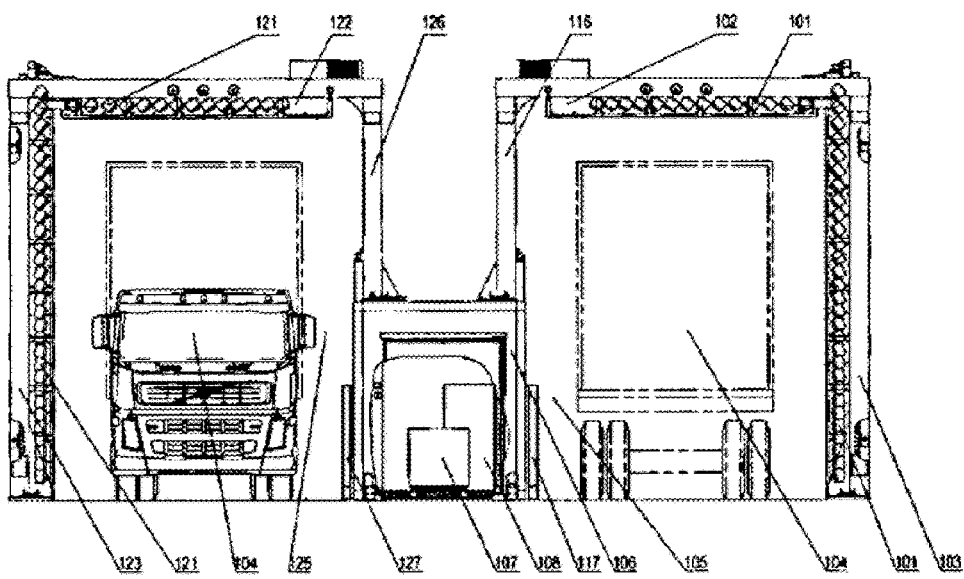
FIG. 9 is a front view of a dual-channel fast-scan container/vehicle inspection system according to the present invention.
Figure 10:
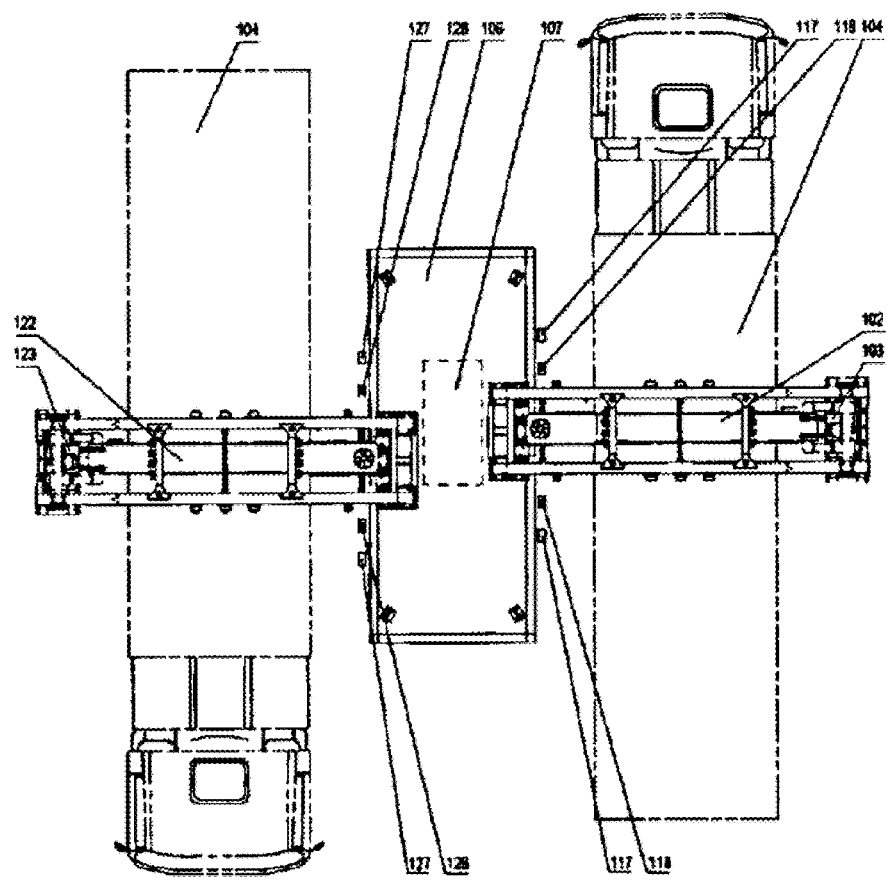
FIG. 10 is a top view of the dual-channel fast-scan container/vehicle inspection system according to the present invention, wherein the left-right direction of FIG. 10 is the left-right direction of the dual-channel fast-scan container/vehicle inspection system, and the up-down direction of FIG. 10 is the travelling direction of a container/vehicle.
Figure 11:
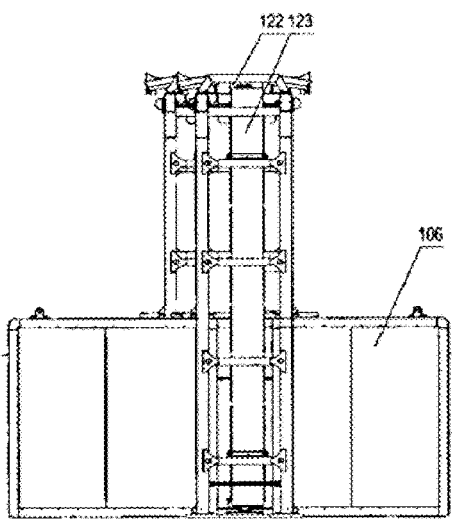
FIG. 11 is a left view of the dual-channel fast-scan container/vehicle inspection system according to the present invention, showing a state without the container/vehicle.

FIG. 9 is a front view of a dual-channel fast-scan container/vehicle inspection system according to the present invention. FIG. 10 is a top view of a container/vehicle inspection system according to the present invention. FIG. 11 is a left view of a container/vehicle inspection system according to the present invention, showing a state without the container/vehicle. The left-right direction of FIG. 9 is the left-right direction of the container/vehicle inspection system. The up-down direction of FIG. 10 is the traveling direction of the container truck.

The container/vehicle inspection system of the present invention, as shown in FIGS. 9 to 11, has a device cabin 106 in which there are the radiation source 107 and the control mechanism 108. The radiation source 107 can emit X-ray beams to a first scanning channel 105 and a second scanning channel 125 as detailed below. The control mechanism 108 includes a radiation source control module (not shown) for controlling the operation of the radiation source 107, an image acquisition module (not shown) for acquiring detected images on the basis of the X-rays detected by the first and second detector modules 101, 121 as detailed below and a communication device (not shown) for receiving/outputting control instructions and the detected image signals.

A first portal assembly and a second portal assembly are disposed at the left and right sides of the device cabin 106 respectively. The first and second portal assemblies can be integrally fixed to the device cabin 106 or disposed at a predetermined spacing from the device cabin 106. At respective sides of the device cabin 106, there are formed a first scanning channel 105 and a second scanning channel 125 that are parallel to one another to allow passage of the container truck 104. The present embodiment explains the circumstance that the first and second scanning channels 105, 125 are parallel to each other; however, the first and second scanning channels 105, 125 can also be at a predetermined angle with respect to each other.

In the present example, the first portal assembly includes a vertical first support arm 116, a horizontal first transverse detector arm support 102 and a vertical first vertical detector arm support 103. The first support arm 116 is installed at one end onto the upper surface of the device cabin 106 and connected at the other end with one end of the first transverse detector arm support 102. The first vertical detector arm support 103 is connected at one end with the other end of the first transverse detector arm support 102 and fixed at the other end with the ground, wherein a plurality of first detector modules 101 for detecting the X-ray beams emitted from the radiation source 107 is installed respectively on the first transverse detector arm support 102 and the first vertical detector arm support 103.

On the other hand, the second portal assembly includes a vertical second support arm 126, a horizontal second transverse detector arm support 122 and a vertical second vertical detector arm support 123. The second support arm 126 is installed at one end onto the upper surface of the device cabin 106 and connected at the other end with one end of the second transverse detector arm support 122. The second vertical detector arm support 123 is connected at one end with the other end of the second transverse detector arm support 122 and fixed at the other end with the ground, wherein a plurality of second detector modules 121 for detecting the X-ray beams emitted from the radiation source 107 is installed respectively on the second transverse detector arm support 122 and the second vertical detector arm support 123.

The example as stated above shows exemplarily that the portal assemblies include vertical support arms 116, 126, horizontal transverse detector arm supports 102, 122 and vertical detector arm supports 103, 123. However, the portal assembly is not limited thereto. The portal assembly can be of any structure as long as scanning channels can be formed at the left and right sides of the device cabin 106 respectively. For example, the extending direction of the transverse detector arm supports 102, 122 and vertical detector arm supports 103, 123 can be adjusted depending on actual arrangement requirements. In addition, the transverse detector arm supports and vertical detector arm supports can be not only fixed to one another, but also rotated relative to one another within a predetermined angle range. Furthermore, the present example shows exemplarily that the portal assembly includes a straight transverse detector arm support and a straight vertical detector arm support. However, the shape and number of the detector arm supports can be suitably selected depending on actual arrangement requirements. Furthermore, the present example shows exemplarily that the first and second portal assemblies are mounted onto the device cabin 106. However, this is not a limitation thereto. The first and second portal assemblies can also be arranged separated from the device cabin 106 with a predetermined spacing.

FIG. 10 exemplarily shows a structure in which the first and second portal assemblies are staggered from one another along the travelling direction of the container truck 104. In this case, the dual-target linear accelerator of the example 1 is used as a radiation source, and two accelerating tubes 13, 18 thereof are staggered when viewed from front (the left-right direction of FIG. 3 and the direction perpendicular to the paper of FIG. 4). When the standing wave electron linear accelerator 107 is disposed in the device cabin 106, the incident positions of the X-ray beams emitted towards the first scanning channel 105 and the second scanning channel 125 respectively are staggered from one another in the travelling direction of the container truck 104. Thus, the sectors formed of the X-ray beams emitted into the first and second scanning channels 105, 125 respectively are perpendicular to the travelling direction of the container truck 104 and staggered from one another in the travelling direction of the container truck 104, which can better optimize the radiation protection effect.

The present invention is not limited thereto. When the incident positions of the X-ray beams emitted towards the first scanning channel 105 and the second scanning channel 125 respectively are coincident with the travelling direction of the container truck 104 (for instance, the low-energy standing wave electron linear accelerator of the example 2 is used), the sectors formed of the X-ray beams emitted into the first and second scanning channels 105, 125 respectively are co-planar. The first portal assembly and the second portal assembly are aligned with each another in the travelling direction of the container truck 104.

In the present embodiment, FIG. 10 exemplarily shows a structure in which the first and second portal assemblies are arranged perpendicular to the travelling direction of the container truck 104. This structure is used when the X-ray beams perpendicular to the traveling direction of the container truck are respectively emitted into the first and second scanning channels 105, 125.

The present invention is not limited thereto. In case the sector formed of the X-ray beams emitted from the radiation source 107 is not along the left-right direction of the container/vehicle inspection system (a direction perpendicular to the traveling direction of the container truck 104), but at a predetermined angle with respect to the left-right direction of the container/vehicle inspection system, accordingly, the first and second portal assemblies are arranged such that their respective transverse detector arm supports 102, 122 extend at said predetermined angle with respect to the left-right direction of the container/vehicle inspection system.

In the present example, outside of the first portal assembly and the second portal assembly there is a protection device (not shown) surrounding the first portal assembly and the second portal assembly. Outside of the protection device there is a remote control mechanism including a communication device for sending control instructions and a display module for displaying the detected images, etc.

A first speed sensor 117 disposed in the first scanning channel 105 and a second speed sensor 127 disposed in the second scanning channel 125 are used to detect the traveling speeds of the inspected container trucks 104 in the first and second scanning channels 105, 125 respectively. The radiation source control module controls the emitting frequencies of X-ray beams emitted from the radiation source 107 to the first and second scanning channels 105, 125 on the basis of the detection results of the first and second speed sensors 117, 127.

Therefore, the emitting frequencies of X-ray beams emitted from the radiation source 107 to the respective first and second scanning channels 105, 125 can be controlled according to the moving speed of the container truck 104 in the respective first and second scanning channels 105, 125, so as to inspect the container trucks 104 of different moving speeds more precisely. In particular, since the radiation source control module respectively controls the emitting frequencies of X-ray beams emitted from the radiation source 107 to the first and second scanning channels 105, 125 on the basis of the detection results of the first and second speed sensors 117, 127, the emitting frequencies of X-ray beams in the first and second scanning channels 105, 125 can be adjusted respectively so as to perform precise inspection on the container trucks 104 in the two scanning channels 105, 125 even if the moving speeds of the container trucks 104 in the first and second scanning channels 105, 125 are different.

In the present example, the radiation source control module can control the emission/stop of the two X-ray beams emitted by the radiation source 107 respectively. In addition, a first position sensor 118 is disposed in the first scanning channel 105 and a second position sensor 128 is disposed in the second scanning channel 125. When it is determined according to the detection result of the first position sensor 118 that the container truck 104 arrives at a predetermined position in the first scanning channel 105, the radiation source 107 emits X-ray beams towards the first scanning channel 105. When it is determined according to the detection result of the first position sensor 118 that the container truck 104 has completely passed through the first scanning channel 105, the radiation source 107 stops emitting X-ray beams towards the first scanning channel 105. On the other hand, when it is determined according to the detection result of the second position sensor 128 that the container truck 104 arrives at a predetermined position in the second scanning channel 125, the radiation source 107 emits X-ray beams towards the second scanning channel 125. When it is determined according to the detection result of the second position sensor 128 that the container truck 104 has completely passed through the second scanning channel 125, the radiation source 107 stops emitting X-ray beams towards the second scanning channel 125.

When there is no container/vehicle in the scanning channels, emission of X-rays is stopped to avoid unnecessary energy waste and ensure radiation safety. Scanning inspection can be conducted in either a single-channel manner or a dual-channel manner depending on the actual requirements. Since the X-ray beams are emitted only when it is determined that the container truck 104 arrives at the predetermined position in the first or second scanning channels 105, 125, by setting the protective position for a driver of the container truck 104 as the predetermined position, for example, the X-ray beams are emitted towards the scanning channels only when the driver arrives at the protective position, thereby preventing the driver from being injured by X-rays.

Moreover, in the present example, the radiation source control module automatically controls the operation of the radiation source 107 according to an automatic control program, thereby saving man power required for inspection of the container truck 104.

3. Working Process of the Dual-Channel Fast-Scan Container/Vehicle Inspection System Reference is made to FIGS. 9 and 10 to explain the working process of the dual-channel fast-scan container/vehicle inspection system of the present invention, and the control process thereof during the scanning inspection is automatically made.

Since the detection action of the first scanning channel 105 corresponds to that of the second scanning channel 125, only the working process of the first scanning channel 105 is explained in detail.

Firstly, before the container truck 104 enters into the first scanning channel 105, it is determined according to the detection results of the first speed sensor 117 and the first position sensor 118 that there is no container truck 104 in the first scanning channel 105, such that the radiation source control module is controlled to cut off the emission of the X-ray beams from the radiation source 107 to the first scanning channel 105.

When the driver drives the container truck 104 into the first scanning channel 105, the first speed sensor 117 detects the traveling speed of the container truck 104. The emitting frequency of the beams emitted from the radiation source 107 to the first scanning channel 105 is determined on the basis of the detection result of the first speed sensor 117. Meanwhile, the first position sensor 118 detects the position of the container truck 104. When it is determined according to the detection result of the first position sensor 118 that the driver of the container truck 104 arrives at the predetermined protection position and the logical state of the container truck 104 is correct, the radiation source control module controls the radiation source 107 to emit the X-ray beams towards the first scanning channel 105 at the above calculated emitting frequency to thereby conduct scanning inspection for the container truck 104. The X-ray beams are received by the plurality of first detector modules 101 installed on the first portal assembly. The detected X-ray beams are converted by a signal converting module (not shown) into electric signals to be input into the image acquisition module in the device cabin 106 to thereby acquire detected images.

When the container truck 104 continues to completely pass through the first scanning channel 105, the first position sensor 118 and the first speed sensor 117 detect this state, and the radiation source control module controls the radiation source 107 to stop emitting the X-ray beams towards the first scanning channel 105, thereby finishing scanning inspection of the container truck 104 in the first scanning channel 105.

In the present example, the emission of X-rays by the radiation source 107 towards two scanning channels respectively can be automatically started/stopped according to the sequence of the container truck 104 into the first scanning channel 105 and the second scanning channel 125, and the emitting frequencies of the X-ray beams towards the two scanning channels 105, 125 can be automatically adjusted according to the moving speed of the container truck 104 in two respective scanning channels 105, 125, so as to conduct scanning inspection of the container truck 104 in the two respective scanning channels 105, 125 more effectively and precisely. According to the present example, the inspection system can conduct scanning inspection for the container truck 104 entering into any of the first scanning channel 105 and the second scanning channel 125, as well as the respective container trucks 104 entering into the two scanning channels 105, 125 simultaneously.

(III) Mobile Container/Vehicle Inspection System

1. Structure of the Mobile Container/Vehicle Inspection System

Figure 12:
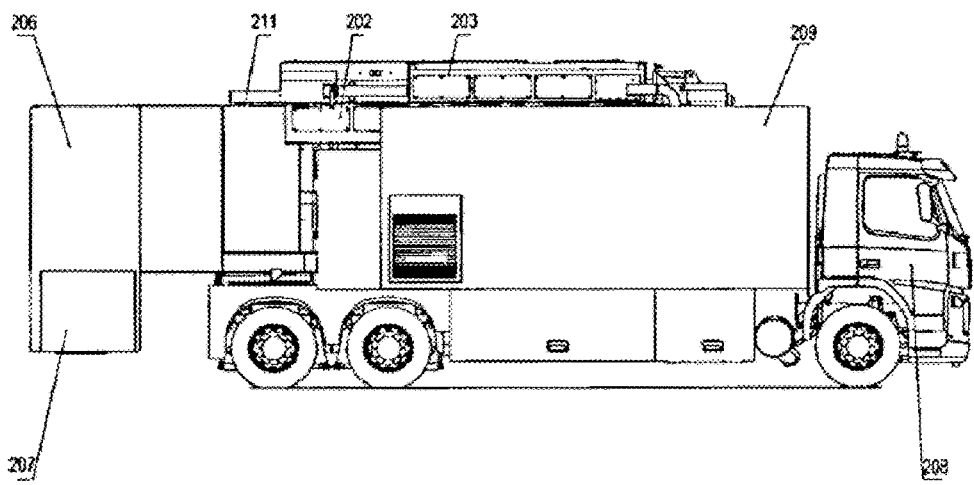
FIG. 12 is a view of a mobile container/vehicle inspection system in a retracted state according to the present invention when viewed from the right of the container/vehicle inspection system.
Figure 13:
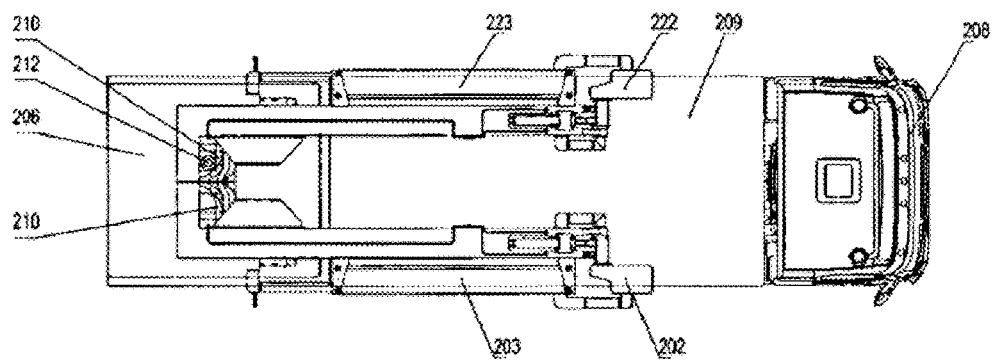
FIG. 13 is a top view of the mobile container/vehicle inspection system in a retracted state according to the present invention, wherein the up-down direction of FIG. 13 is the left-right direction of the mobile container/vehicle inspection system, and the left-right direction of FIG. 13 is the travelling direction of the container/vehicle.

FIG. 12 is a view of the mobile container/vehicle inspection system in a retracted state according to the present invention when viewed from the right of the container/vehicle inspection system. FIG. 13 is a top view of the mobile container/vehicle inspection system in a retracted state according to the present invention. In FIG. 13, the right side is the front of the chassis vehicle, and the up-down direction is the left-right direction of the chassis vehicle.

As shown in FIGS. 12 and 13, the mobile container/vehicle inspection system according to the present invention has a chassis vehicle 208 as a travelling mechanism. A control cabin 209 is disposed on the vehicle body frame (not shown) of the chassis vehicle 208. In the control cabin 209 there are an actuation control module, an image acquisition module, an operation inspection module, a display module, and a working chamber composed of an X-ray protecting material (not shown).

At the rear side of the control cabin 209 (i.e., the tail side of the vehicle body frame of the chassis vehicle 208), a pair of rotary platforms 210 are disposed symmetrically in the left-right direction of the chassis vehicle 208. The pair of rotary platforms 210 can be rotated respectively towards left and right with respect to the vehicle body frame of the chassis vehicle 208 by means of actuation of a rotary platform hydraulic motor 212.

A pair of left and right portal assemblies linked with the pair of left and right rotary platforms 210 and switchable between a retracted state and an open state are mounted on the rotary platforms.

As shown in FIGS. 12 and 13, the pair of left and right portal assemblies respectively include a transverse detector arm support (a first transverse detector arm support 203 and a second vertical detector arm support 223), a pair of left and right vertical detector arm supports (a first vertical detector arm support 202 and a second vertical detector arm support 222), and hydraulic cylinders (not shown) connected between the first transverse detector arm support 203 and the first vertical detector arm support 202, as well as between the second vertical detector arm support 223 and the second vertical detector arm support 222 so as to rotate the vertical detector arm supports 202, 222 downwardly to be expanded with respect to the transverse detector arm supports 203, 223.

The so-called retracted state of the portal assembly is a state as follows: as shown in FIG. 13, the first vertical detector arm support 202 and the first transverse detector arm support 203 of the pair of left and right portal assemblies are superposed in a horizontal state to rest above the control cabin 209, and are received inside the chassis vehicle 208 when viewed in the left-right direction of the chassis vehicle 208. The second vertical detector arm support 222 and the second transverse detector arm support 223 are also superposed in a horizontal state to rest above the control cabin 209, and are received inside the chassis vehicle 208 when viewed in the left-right direction of the chassis vehicle 208. Then, the first vertical detector arm support 202 and the first transverse detector arm support 203 in the retracted state are parallel superposed in the up-down direction. The vertical detector arm support 222 and the transverse detector arm support 223 are parallel superposed in the up-down direction.

Figure 14:
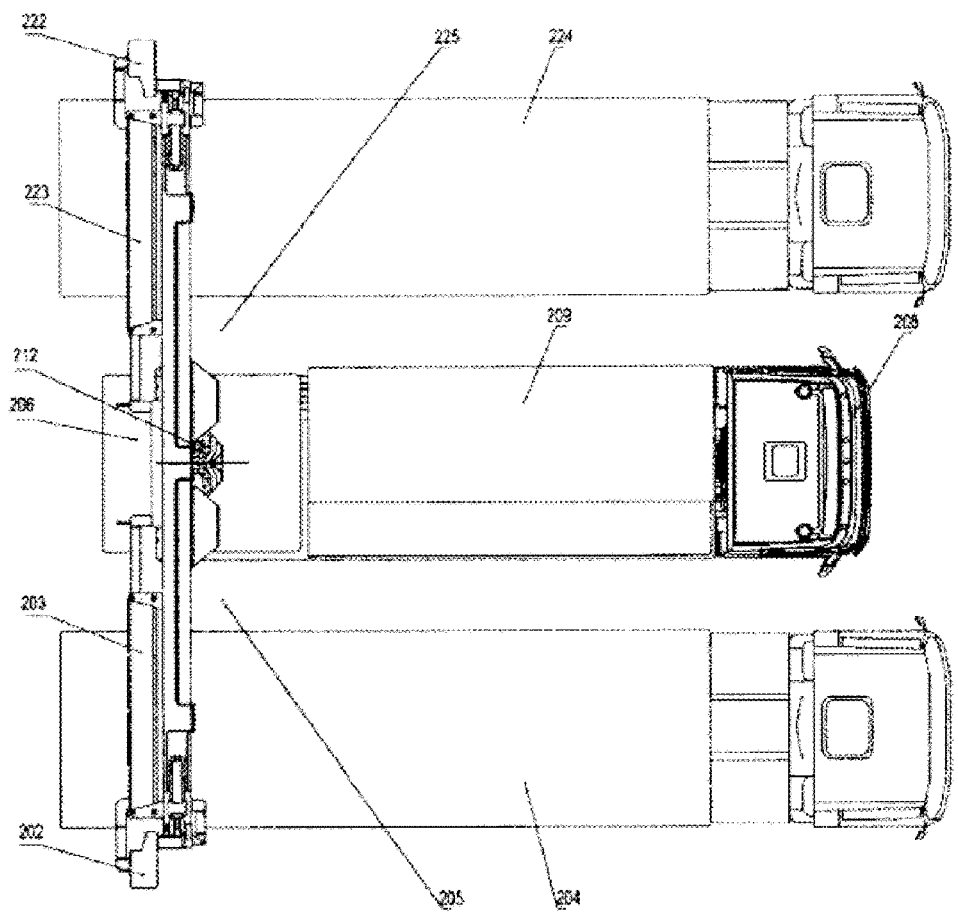
FIG. 14 is a top view of the mobile container/vehicle inspection system in an open state according to the present invention.
Figure 15:
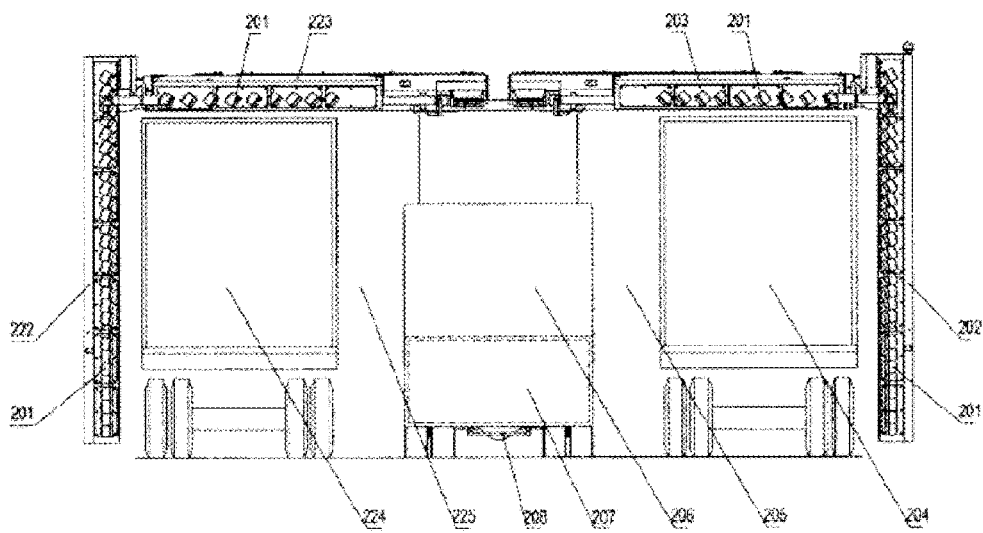
FIG. 15 is a view of the mobile container/vehicle inspection system in an open state according to the present invention when viewed from the rear of the container/vehicle inspection system.
Figure 16:
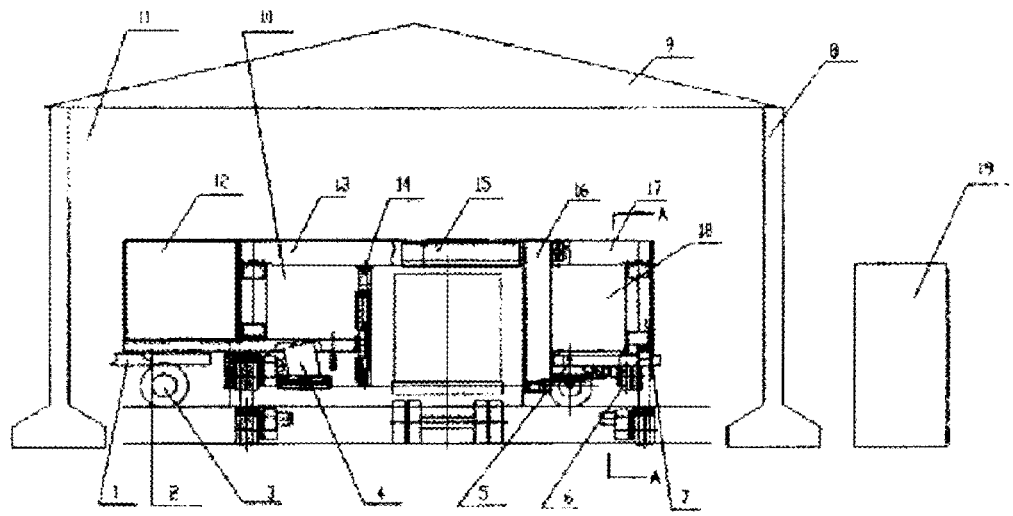
FIG. 16 is a schematic view of a prior art relocatable container inspection system.

The so-called open state of the portal assembly is a state as follows: as shown in FIGS. 14 and 15, the transverse detector arm supports 203, 223 and the vertical detector arm supports 202, 222 of the pair of portal assemblies are rotated 90 degrees respectively with respect to the pair of rotary platforms 210 towards left and right sides of the chassis vehicle 208, and the vertical detector arm supports 202, 222 are rotated downwardly to be expanded with respect to the transverse detector arm supports 203, 223.

In the present invention, the pair of rotary platforms 210 are each fixed to an end of the transverse detector arm supports 203 or 223 of the pair of portal assemblies via an elevating hydraulic cylinder 211, such that the transverse detector arm supports 203, 223 can be elevated with respect to the chassis vehicle while keeping parallel by means of actuation of the elevating hydraulic cylinder. The vertical detector arm support 202 is mounted on the other end of the transverse detector arm support 203 via an expanding hydraulic cylinder (not shown), the vertical detector arm support 222 is mounted on the other end of the transverse detector arm support 223 via an expanding hydraulic cylinder (not shown), such that the vertical detector arm supports 202, 222 can change between a state perpendicular to the transverse detector arm supports 203, 223 and a state parallel to the detector arm supports 203, 223.

A rotary platform hydraulic motor 212 is described as a mechanism for rotating the pair of rotary platforms 210, and the hydraulic cylinder is described as a mechanism for actuating the pair of portal assemblies linking with the pair of rotary platforms 210. However, the present invention is not limited thereto. Other manners conventionally used by those skilled in the art can be used as alternatives, for example, a linking mechanism, a pneumatic actuator, or an electric actuator.

A plurality of detector modules 201 for detecting the X-ray beams emitted from the radiation source 207 is respectively arranged on the transverse detector arm supports 203, 223 and the vertical detector arm supports 202, 222 of the pair of portal assemblies.

In the rear portion of the chassis vehicle 208 there is a device cabin 206 extending more rearward than the vehicle body frame. In the device cabin 206 there are the dual-target standing wave electron linear accelerator acting as the radiation source 207, and devices such as the radiation source control module (not shown). The dual-target standing wave electron linear accelerator of the example 2 is used as the standing wave electron linear accelerator.

3. Working Process of the Mobile Container/Vehicle Inspection System

Reference is made to FIGS. 9 to 15 to explain the working process of the mobile container/vehicle inspection system of the present invention.

Firstly, the mobile container/vehicle inspection system of the present invention can run in the retracted state on standard roads to arrive at predetermined target positions.

Upon radiation image inspection for containers/vehicles, the control mechanism (not shown) controls the action of the hydraulic cylinders to accomplish the following actions.

Firstly, the pair of portal assemblies, namely, the first vertical detector arm support 202 and the first transverse detector arm support 203, as well as the second vertical detector arm support 222 and the second transverse detector arm 223, are raised vertically together under the action of the elevating hydraulic cylinder 211 and stop until reaching a predetermined height.

Thereafter, the rotary platform hydraulic motor 212 is actuated to rotate the pair of left and right rotary platforms 210 together with the portal assemblies thereon towards left and right directions by 90 degrees and then comes to a halt.

The expanding hydraulic cylinders (not shown) in two portal assemblies are actuated to rotate the vertical detector arm supports 202, 222 downwardly 90 degrees with respect to the transverse detector arm supports 203, 223 and then changed into an expanding state.

The two portal assemblies form the first scanning channel 205 and the second scanning channel 225 respectively at left and right sides of the chassis vehicle 208.

When the two scanning channels 205, 225 are formed, the radiation source control module (not shown) controls the standing wave electron linear accelerator acting as the radiation source 207 to make it emit X-ray beams towards left and right sides of the chassis vehicle 208.

Since the radiation source is configured in the lower rear portion of the rotary platforms 210 to make the X-ray source of the radiation source lower than the chassis of the chassis vehicle 208, the sectors formed of the X-rays emitted by the radiation source towards left and right sides respectively pass through a first container truck 204 in the first scanning channel 205, and a second container truck 224 in the second scanning channel 225 at lower positions, and are located more rear with respect to the rear portion of the chassis vehicle 208.

The X-rays are received by the plurality of detector modules 201 disposed on the vertical detector arm supports 202, 222 and the transverse detector arm supports 203, 223 of the pair of portal assemblies. The detected X-rays are converted by the signal conversion module (not shown) into electric signals and input into the image acquisition module in the control cabin 209. The image acquisition module sends the image signals to an operation inspection module and the display module displays the detection results.

The mobile container/vehicle inspection system needs to be changed to a transportation state after inspection. The radiation source control module stops the operation of the standing wave electron linear accelerator acting as the radiation source 207.

The action of the expanding hydraulic cylinder (not shown) is controlled to make the vertical detector arm supports 202, 222 rotated to be retracted with respect to the transverse detector arm supports 203, 223 and then superposed horizontally under the transverse detector arm supports 203, 223.

The rotary platform hydraulic motor 212 is controlled to rotate the pair of rotary platforms 210, along with the vertical detector arm support 202 and the transverse detector arm support 203, as well as the vertical detector arm support 222 and the transverse detector arm 223 of the respective portal assemblies, ninety degrees towards the chassis vehicle 208. When viewed in the left-right direction of the chassis vehicle 208, the vertical detector arm supports 202, 222 and the transverse detector arm supports 203, 223 are superposed in a horizontal state in the up-down direction to rest inside the chassis vehicle 208 in the left-right direction thereof.

The elevating hydraulic cylinder 211 is actuated to descend the pair of portal assemblies, such that the vertical detector arm supports 202, 222 and the transverse detector arm supports 203, 223 of the pair of portal assemblies are in a retracted state, in which they are superposed in a horizontal state in the up-down direction to rest above the control cabin.

The above embodiment discloses a pair of portal assemblies formed by folding the transverse detector arm supports and vertical detector arm supports, and switchable between an open state and a retracted state by means of the pair of left and right rotary platforms, the elevating actuators and the expanding actuators. However, the invention is not limited thereto. The shape, number or actuation of the components consisting of the portal assemblies can be suitably changed depending on actual requirements. For example, the rotary platforms can be omitted, and the pair of portal assemblies can be directly rotated by means of rotary actuators respectively.

Furthermore, the above embodiment discloses the pair of portal assemblies and the pair of rotary platforms disposed at the rear end of the chassis vehicle and received in the retracted stated above the control cabin and inside the left and right sides of the chassis vehicle. However, it is not limited thereto. The pair of portal assemblies can be arranged in other suitable positions of the chassis vehicle as long as the scanning channels can be formed at the left and right sides of the chassis vehicle, and can be arranged in other positions of the chassis vehicle in the retracted state, for instance, can be arranged and folded to be received at the left and right sides of the chassis vehicle, or the rear portion of the chassis vehicle.

Furthermore, the above embodiment discloses that the radiation source is arranged in the lower rear portion of the rotary platforms. However, it is not limited thereto. The radiation source may also be arranged for example in other suitable positions of the chassis vehicle depending on the requirements, such as in the rear portion of the rotary platform.

(IV) Relocatable Container/Vehicle Inspection System

1. Structure of the Relocatable Container/Vehicle Inspection System

Figure 17:
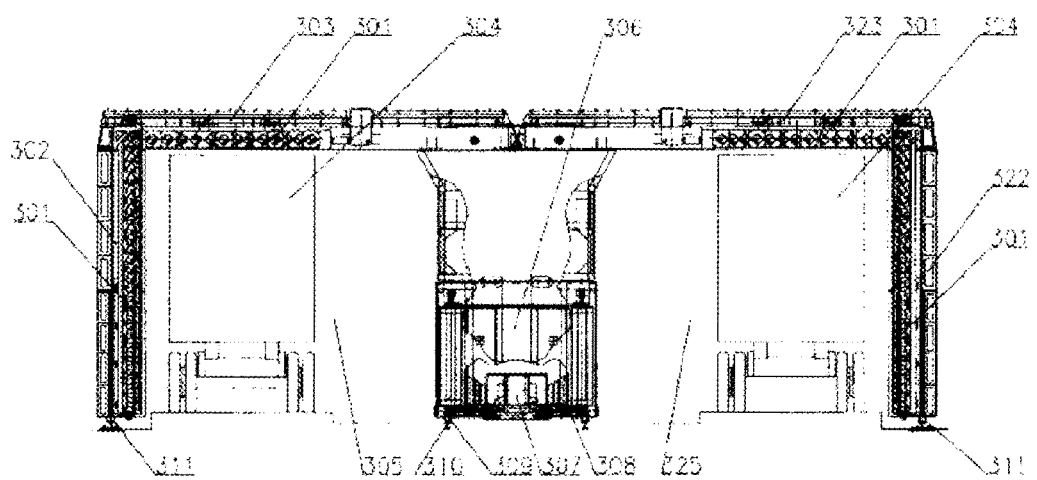
FIG. 17 is a front view of the relocatable container/vehicle inspection system according to the present invention.
Figure 18:
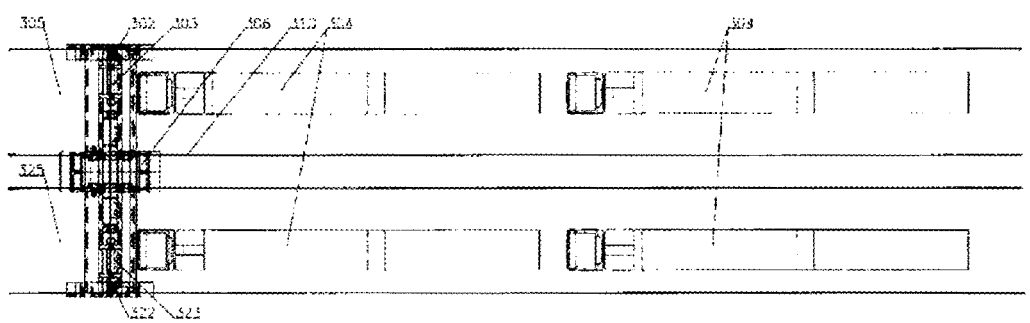
FIG. 18 is a schematic top view of the relocatable container/vehicle inspection system according to the present invention without a mobile shielding room, wherein the up-down direction of FIG. 18 is the left-right direction of the relocatable container/vehicle inspection system, and the left-right direction of FIG. 18 is the travelling direction of the container/vehicle.

FIG. 17 is a front view of the relocatable container/vehicle inspection system in a retracted state according to the present invention, and FIG. 18 is a schematic top view of the relocatable container/vehicle inspection system according to the present invention without a mobile shielding chamber. The left-right direction of FIG. 17 is the left-right direction of the relocatable container/vehicle inspection system.

The relocatable container/vehicle inspection system of the present invention has a mobile shielding chamber (not shown) that can prevent dispersion of X-rays and can be detachably assembled, an automatic scanning vehicle acting as a traveling scanning detection mechanism, and a remote control mechanism that remotely controls the scanning actions of the automatic scanning vehicle and displays the detection results.

The mobile shielding chamber consists of protective walls and a mobile roof that are detachably assembled, wherein the protective walls are composed of wall pillars made of a plurality of cement concrete columns with their longitudinal cross sections mutually embedded. The mobile shielding chamber is mounted around the automatic scanning vehicle.

Outside the mobile shielding chamber there is the remote control mechanism, including an action control module for controlling the traveling actions of the automatic scanning vehicle according to the inspection action instructions, an operation inspection module, a display module and a communication device, etc. Upon scanning and inspection, the remote control mechanism remotely controls the scanning actions of the automatic scanning vehicle, such as the traveling actions, according to the communication signals sent by the communication device, and receives image signals representative of detection results from the automatic scanning vehicle. The image signals are input into the operation detection module and then the display module shows the detection results.

As shown in FIGS. 17 and 18, the automatic scanning vehicle has a vehicle frame 308. Drive wheels 309 acting as a sliding guide mechanism are disposed at the left and right sides of the lower surface of the vehicle frame 308. The automatic scanning vehicle can slide along the guide rail 310 disposed on the ground by means of the drive wheels 309.

A device cabin 306 is disposed on the vehicle frame 308 and provided therein with the radiation source control module for controlling the actions of the radiation source 307, the image acquisition module for acquiring detected images on the basis of the X-rays detected by the following detector module 301, and the communication device for communicating with the control mechanism outside the mobile shielding chamber, etc. The radiation source 307 is the dual-target standing wave electron linear accelerator as described above.

Furthermore, the pair of left and right portal assemblies are disposed on the vehicle frame 308 of the automatic scanning vehicle. As shown in FIG. 17, the pair of portal assemblies extend respectively towards the left and right sides of the automatic scanning vehicle for forming, at the left and right sides of the automatic scanning vehicle, the first scanning channel 305 and the second scanning channel 325 through which the detected container/vehicle 304 can pass.

To be specific, the pair of portal assemblies respectively have horizontally-extending transverse detector arm supports 303, 323 and vertical-extending vertical detector arm supports 302, 322, by means of which the first scanning channel 305 and the second scanning channel 325 are formed at left and right sides of the automatic scanning vehicle. The example shows exemplarily that the portal assembly includes horizontal transverse detector arm supports 303, 323 and vertical detector arm supports 302, 322. However, it is not limited thereto. The portal assembly can be of any structure as long as scanning channels can be formed at the left and right sides of the automatic scanning vehicle respectively. For example, the extending direction of the transverse detector arm supports 303, 323 and vertical detector arm supports 302, 322 can be adjusted depending on actual arrangement requirements. In addition, the transverse detector arm supports 303, 323 and vertical detector arm supports 302, 322 can be not only fixed to one another, but also rotated relative to one another within a predetermined angle range. Furthermore, the present example shows exemplarily that the portal assembly includes a straight transverse detector arm support and a straight vertical detector arm support. However, the shape and number of the detector arm supports can be suitably selected depending on actual arrangement requirements.

A plurality of detector modules 301 for detecting the X-rays emitted from the radiation source 307 is respectively arranged on the transverse detector arm supports 303, 323 and vertical detector arm supports 302, 322 of the pair of the portal assemblies.

In the present example, a driven wheel 311 acting as a sliding guide mechanism is disposed at the lower end of each of the vertical detector arm supports 302, 322, and can slide along the guide rail 310 disposed on the ground. It describes the circumstance that the driven wheel 311 acting as a sliding guide mechanism is disposed at the lower end of each of the vertical detector arm supports 302, 322. However, it is not limited thereto. The vertical detector arm supports 302, 322 can also be in the form of a cantilever structure without a driven wheel 311 on the bottom thereof.

2. Working Process of the Relocatable Container/Vehicle Inspection System

Reference is made to FIGS. 17 and 18 to explain the working process of the relocatable container/vehicle inspection system of the present invention.

Firstly, the automatic scanning vehicle of the present invention is loaded and conveyed by a loading vehicle (not shown) to a position in need of scanning inspection. The drive wheels 309 at the lower surface of the vehicle frame 308 of the automatic scanning vehicle and the driven wheels 311 at the lower ends of the two vertical detector arm supports 302, 322 are respectively slidingly connected with the guide rail 310 disposed on the inspection site. After the automatic scanning vehicle is arranged, the mobile shielding chamber is installed outside the automatic scanning vehicle, and the control mechanism is installed outside the mobile shielding chamber.

When the inspection system of the present invention is ready, the container/vehicle 304 as the detected device is moved into the mobile shielding chamber, the first scanning channel 305 and the second scanning channel 325. The communication device of the control mechanism sends control signals which are received by the communication device in the device cabin 306 of the automatic scanning vehicle to thereby control the automatic scanning vehicle to move automatically along the guide rail 310. The portal frames formed of the pair of left and right portal assemblies stride over the container/vehicle 304 acting as the detected device.

Meanwhile, the radiation source control module controls, according to the communication signals from the control mechanism, the dual-target standing wave electron linear accelerator 307 to emit X-rays to the left and right sides of the scanning channels 305, 325 simultaneously, and the X-rays are received by the detector modules 301 installed on the pair of left and right portal frames. The detected X-rays are converted by the signal conversion module (not shown) into electric signals and input into the image acquisition module in the device cabin 306. The image acquisition module transmits image signals to the operation inspection module and the display module shows the detection results.

When the scanning finishes, the automatic scanning vehicle stops moving according to the control signals from the control mechanism and then changes into a standby state ready for the next scanning instruction.

Preferred embodiments of the present invention are described as above. It should be appreciated that the present invention is not limited to the above embodiments, but defined by the appended claims. The shapes and combinations of the components shown in the embodiments are only exemplary in nature, and can be added, omitted, replaced or modified without departing from the scope and spirit of the present invention.

What is claimed is:

1. A standing wave electron linear accelerator, comprising:
    a magnetron for producing radio frequency microwaves;
    a plurality of accelerating tubes for forming standing waves therein to accelerate electrons therein;
    a microwave transmission system connected between the magnetron and the plurality of accelerating tubes to feed the microwaves from the magnetron into the plurality of accelerating tubes to form standing waves in the plurality of accelerating tubes;
    a plurality of electron guns for emitting electron beams into the plurality of accelerating tubes;
    a plurality of targets corresponding to and located in the plurality of accelerating tubes respectively, which are configured to be impinged by the accelerated electron beams in the accelerating tubes to form a plurality of continuous spectrums of X-rays;
    a plurality of shielding devices disposed corresponding to the plurality of targets, which are configured to, among the plurality of continuous spectrums of X-rays, remain an X-ray beam of a desired shape in a forward direction and shield X-rays oriented at other angles; and
    a microwave distributor disposed in the microwave transmission system for distributing the microwaves in the microwave transmission system into the accelerating tubes.

2. The standing wave electron linear accelerator according to claim 1, wherein there are two said accelerating tubes, two said targets, two said electron guns and two said shielding devices, and the microwave distributor is configured to distribute the microwaves into the two accelerating tubes; and
    the standing wave electron linear accelerator is configured to emit X-ray beams towards both sides respectively.

3. The standing wave electron linear accelerator according to claim 2, wherein the two accelerating tubes are inclined upwardly with respect to a horizontal direction; and
    the two accelerating tubes are staggered with one another in a front-rear direction of the standing wave electron linear accelerator.

4. A dual-channel container/vehicle inspection system, comprising:
    a first portal assembly for forming a first scanning channel for passage of a container/vehicle and provided with a plurality of first detector modules;
    a second portal assembly for forming a second scanning channel for passage of a container/vehicle and provided with a plurality of second detector modules; and
    a radiation source, which is the standing wave electron linear accelerator according to claim 2 and is disposed between the first portal assembly and the second portal assembly to emit X-ray beams to the first scanning channel and the second scanning channel respectively.

5. The container/vehicle inspection system according to claim 4, further comprising:
    a control mechanism comprising a radiation source control module and an image acquisition module; and
    a device cabin disposed between the first portal assembly and the second portal assembly, wherein the radiation source and the control mechanism are disposed in the device cabin.

6. The container/vehicle inspection system according to claim 5, further comprising: a first speed sensor and a second speed sensor for detecting traveling speeds of the containers/vehicles in the first and second scanning channels respectively, wherein the radiation source control module is configured to control emitting frequencies of X-ray beams emitted from the radiation source to the first and second scanning channels respectively on the basis of detection results of the first and second speed sensors.

7. The container/vehicle inspection system according to claim 5, wherein the radiation source control module is configured to control emission/stop of the two X-ray beams emitted by the radiation source; and further comprising: a first position sensor and a second position sensor for detecting traveling positions of the containers/vehicles in the first and second scanning channels respectively; when it is determined that the container/vehicle reaches a predetermined position in the first scanning channel according to a detection result of the first position sensor, the radiation source emits the X-ray beam to the first scanning channel, and when it is determined that the container/vehicle reaches a predetermined position in the second scanning channel according to a detection result of the second position sensor, the radiation source emits the X-ray beam to the second scanning channel.

8. The container/vehicle inspection system according to claim 4, wherein the first and second portal assemblies are staggered from one another in a traveling direction of the container/vehicle, and incident positions of the X-ray beams emitted from the radiation source to the first and second scanning channels are staggered from one another in the traveling direction of the container/vehicle.

9. The container/vehicle inspection system according to claim 4, wherein the first portal assembly comprises a first transverse detector arm support and a first vertical detector arm support, wherein the plurality of the first detector modules is respectively disposed on the first transverse detector arm support and the first vertical detector arm support; the second portal assembly comprises a second transverse detector arm support and a second vertical detector arm support, wherein the plurality of the second detector modules is respectively disposed on the second transverse detector arm support and the second vertical detector arm support.

10. The container/vehicle inspection system according to claim 9, wherein the first transverse detector arm support and the second transverse detector arm support extend perpendicular to a traveling direction of the container/vehicle respectively, and incident directions of the X-ray beams emitted from the radiation source to the first and second scanning channels respectively are perpendicular to the traveling direction of the container/vehicle.

11. The container/vehicle inspection system according to claim 9, wherein the first transverse detector arm support and the second transverse detector arm support extend at a predetermined angle with respect to a direction perpendicular to a traveling direction of the container/vehicle respectively, and incident directions of the X-ray beams emitted from the radiation source to the first and second scanning channels respectively are at the predetermined angle with the direction perpendicular to the traveling direction of the container/vehicle.

12. A mobile container/vehicle inspection system, comprising:
a chassis vehicle which is serving as a traveling mechanism;
a pair of left and right portal assemblies which are switchable between an open state in which scanning channels are formed at left and right sides of the chassis vehicle and a retracted state in which the portal assemblies are retracted towards the chassis vehicle;
a radiation source, which is the standing wave electron linear accelerator of claim 2, capable of emitting X-ray beams towards left and right sides simultaneously; and
a plurality of detector modules respectively mounted on the pair of portal assemblies to detect the X-ray beams emitted from the radiation source.

13. The mobile container/vehicle inspection system according to claim 12, further comprising:
a pair of left and right rotary platforms mounted on the chassis vehicle, which is configured to be rotated towards left and right sides of the chassis vehicle, wherein the pair of left and right portal assemblies are mounted on the chassis vehicle via the pair of left and right rotary platforms and are configured to be rotated along with the pair of left and right rotary platforms; and
a control mechanism including an action control module for controlling actions of the rotary platform and the portal assemblies, a radiation source control module for controlling actions of the radiation source, and an image acquisition module for forming inspection images.

14. The mobile container/vehicle inspection system according to claim 13, wherein the pair of left and right portal assemblies each includes a transverse detector arm support and a vertical detector arm support, wherein the transverse detector arm supports are respectively mounted on the pair of rotary platforms via elevating actuators, the transverse detector arm supports and the vertical detector arm supports are configured to be elevated together when driven by the elevating actuators, the vertical detector arm supports are respectively mounted on the transverse detector arm supports via expanding actuators, and the vertical detector arm supports are configured to be rotated to be expanded with respect to the transverse detector arm supports under actuation of the expanding actuators.

15. The mobile container/vehicle inspection system according to claim 14, wherein the plurality of detector modules are respectively mounted on the transverse detector arm supports and the vertical detector arm supports of the pair of portal assemblies.

16. The mobile container/vehicle inspection system according to claim 13, wherein the pair of rotary platforms are located on a rear end of the chassis vehicle; and
the radiation source is disposed in a lower rear part of the rotary platform so that an X-ray source point of the radiation source is lower than a chassis of the chassis vehicle.

17. The mobile container/vehicle inspection system according to claim 12, wherein the pair of left and right portal assemblies in the retracted state are kept above a control cabin and are received inside the chassis vehicle when viewed in a left-right direction of the chassis vehicle.

18. A relocatable container/vehicle inspection system provided with an automatic scanning vehicle and an action control mechanism for the automatic scanning vehicle, wherein:
the automatic scanning vehicle includes:
a vehicle frame capable of moving with respect to the ground by means of drive wheels;
a pair of left and right portal assemblies arranged on the vehicle frame, which are configured to extend from the vehicle frame towards left and right sides of the automatic scanning vehicle so as to form scanning channels at left and right sides of the automatic scanning vehicle respectively;

a radiation source, which is the standing wave electron linear accelerator of claim 2, capable of emitting X-ray beams simultaneously towards the scanning channels at the left and right sides of the automatic scanning vehicle; and a plurality of detector modules mounted on the pair of portal assemblies respectively, which is configured to detect the X-ray beams emitted from the radiation source.

19. The relocatable container/vehicle inspection system according to claim 18, wherein the pair of left and right portal assemblies have transverse detector arm supports and vertical detector arm supports respectively, by means of which scanning channels are configured to be formed at the left and right sides of the automatic scanning vehicle respectively; and lower ends of the vertical detector arm supports in the pair of left and right portal assemblies are movable by driven wheels respectively along a guide rail disposed on the ground.

20. The relocatable container/vehicle inspection system according to claim 18, wherein the automatic scanning vehicle is movable along a guide rail disposed on the ground by means of drive wheels mounted on a lower surface of the vehicle frame.

* * * * *